(12) United States Patent
Ashida et al.

(10) Patent No.: US 7,820,574 B2
(45) Date of Patent: Oct. 26, 2010

(54) GRAIN LEATHER-LIKE SHEET HAVING EXCELLENT SCRATCH RESISTANCE AND ABRASION RESISTANCE

(75) Inventors: Tetsuya Ashida, Okayama (JP); Norio Makiyama, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 442 days.

(21) Appl. No.: 11/993,628

(22) PCT Filed: Jun. 20, 2006

(86) PCT No.: PCT/JP2006/312316

§ 371 (c)(1),
(2), (4) Date: Feb. 6, 2008

(87) PCT Pub. No.: WO2006/137394

PCT Pub. Date: Dec. 28, 2006

(65) Prior Publication Data

US 2010/0159772 A1 Jun. 24, 2010

(30) Foreign Application Priority Data

Jun. 21, 2005 (JP) ............................. 2005-180595

(51) Int. Cl.
*B32B 27/12* (2006.01)
(52) U.S. Cl. ..................... 442/394; 428/904; 428/316.6
(58) Field of Classification Search ................. 442/394; 428/316.6, 904
See application file for complete search history.

(56) References Cited

U.S. PATENT DOCUMENTS 3,663,472 A * 5/1972 Raymond ..................... 524/11
3,974,320 A * 8/1976 Gerlach et al. ................ 442/63

FOREIGN PATENT DOCUMENTS

| JP | 54 152546 | 11/1979 |
| JP | 59 179636 | 10/1984 |
| JP | 06 330473 | 11/1994 |
| JP | 2000 017581 | 1/2000 |
| JP | 2001 192978 | 7/2001 |

* cited by examiner

*Primary Examiner*—Norca L Torres-Velazquez
(74) *Attorney, Agent, or Firm*—Oblon, Spivak, McClelland, Maier & Neustadt, L.L.P.

(57) ABSTRACT

A grain-finished leather-like sheet having a fibrous substrate layer, a polyurethane non-porous layer and a polyurethane surface layer which are successively laminated in this order. The polyurethane surface layer contains a binder polyurethane and polyurethane fine particles having a particle size of 1 to 50 μm. The total thickness of the polyurethane non-porous layer and the polyurethane surface layer is 150 μm or more. The polyurethane surface layer contains the polyurethane fine particles in an amount of 10 to 40 parts by mass per 100 parts by mass of the binder polyurethane. The polyurethane fine particles are not exposed to the surface. The grain-finished leather-like sheet characterized by the above features has a smooth and luster surface, a good hand, and excellent scratch resistance, abrasion resistance and buckling wrinkle resistance. The sheet hardly damages or soils an object which is in contact with its surface by friction.

6 Claims, 1 Drawing Sheet

US 7,820,574 B2

GRAIN LEATHER-LIKE SHEET HAVING EXCELLENT SCRATCH RESISTANCE AND ABRASION RESISTANCE

CROSS-REFERENCE TO RELATED APPLICATIONS

The present application is a 35 U.S.C. §371 National Stage patent application of International patent application PCT/JP06/312316, filed on Jun. 20, 2006, which claims priority to Japanese patent application JP 2005-180595, filed on Jun. 21, 2005.

TECHNICAL FIELD

The present invention relates to a grain-finished leather-like sheet having a smooth and luster surface and a good hand, which is excellent in the scratch resistance, abrasion resistance and buckling wrinkle resistance and is dyed in bright colors.

BACKGROUND ART

For the grain-finished leather-like sheets composed of a laminate of a fiber substrate and a resin surface layer thereon, the improvement of the surface strength is generally an important problem to be solved. The surface strength has been expressed by many terms according to the intended use of the products made from the grain-finished leather-like sheet. For example, the difficulty of wearing is expressed by a wear resistance, the difficulty of making recessed marks like embossed marks is expressed by a scratch resistance, and the difficult of making fine rubs by friction or irregularity due to degradation or discoloration is expressed by an abrasion resistance.

To improve the wear resistance, there have been used a method of forming the surface layer with a hard resin, a method of adding highly hard fine particles to the resin for the surface layer, a method of making the surface slippery by the modification of resin or the coating to change the surface to be hardly abraded, or a method of increasing the thickness of the surface layer to leave a large margin for wearing. The scratch resistance may be improved by forming the surface layer with a hard resin. The abrasion resistance has been improved by forming the surface layer with a hard resin or making the surface slippery. To make the surface slippery, a fine roughness has been formed on the surface to reduce the contact area with an object. Thus the methods of improving the abrasion resistance have been proposed also in a viewpoint different from the known method of improving the wear resistance by making the surface slippery. However, although the known methods improve the surface strength, the appearance, hand and touch of surface are likely impaired. Thus, the known methods are actually restricted largely with respect to the balance with the appearance and hand.

A leather-like sheet which has been improved in the wear resistance by making the surface resistant to wearing is proposed, for example, in Patent Document 1. In the proposed leather-like sheet, a natural leather-like substrate is laminated with a surface layer mainly made of a non-yellowing polycarbonate urethane resin containing spherical fine powders having a particle size of 10 μm or less which is extremely harder than the urethane resin. Examples of the spherical fine powder include inorganic spherical fine powders such as silica fine powder and glass fine powder, and crosslinked resin fine power such as crosslinked acrylic resin fine powder and crosslinked olefin resin fine powder. Another leather-like sheet which has been improved in the wear resistance by adding similar fine particles is disclosed, for example, in Patent Document 2. In the proposed leather-like sheet, a substrate is laminated with an outermost urethane coating layer containing hard fine particles having a Brinell hardness of 20 to 100. In the proposed techniques, the surface layer itself is made resistant to scaping off, thereby improving the wear resistance. However, since the compatibility is poor, the proposed urethane resin and the fine powder likely slip at their interface by external force. As a result, the plasticity of the urethane resin is increased apparently, thereby failing to improve the scratch resistance and rather reducing the scratch resistance in some cases. In addition, if the surface is slightly worn away to allow the hard fine particles to become exposed, the surface of an object which is in contact with such surface is likely to be scratched upon friction.

A leather-like sheet which is improved in the abrasion resistance by making its surface slippery has been proposed, for example, in Patent Document 3, in which a substrate is bonded to a crosslinked, silicone-modified polyurethane coating layer via a non-crosslinked polyurethane. In another proposed method, the abrasion resistance is improved by disposing a coating layer which is made by adding fluorine powder to a non-modified polyurethane resin (for example, Patent Document 4). With such techniques, the surface is made resistant to abrasion due to rubbing in a very short time and also resistant to wearing, because the surface is made more slippery. Nevertheless, the easiness of forming recessed scratch is not solved and the surface touch is limited only to a slippery touch.

Further, the improvement of the wear resistance and abrasion resistance by adding polyurethane fine particles to the polyurethane resin for forming the coating film has been proposed (for example, Patent Document 5). In the proposed technique, a coating composition prepared by adding spherical polyurethane fine particles having an average particle size of 1 to 800 μm to the binder resin such as polyurethane resin is used. Since the spherical polyurethane fine particles are fixed by the binder resin, a number of spherical polyurethane fine particles are exposed on the surface applied with the coating composition. As a result, the fine roughness of the surface reduces the contact area with an object, to obtain a good wear resistance and also improve the abrasion resistance in some extent. However, the effect of the proposed technique is obtained only in case of the appearance of suede-finished leather-like sheets and the surface touch is limited to rough feeling. If the fine particles exposed to the surface are easy to fall off, the abrasion resistance may be rather reduced, and the easiness of forming recessed scratch is not eliminated.

[Patent Document 1] JP 7-150479A
[Patent Document 2] JP 4-333674A
[Patent Document 3] JP 2000-248472A
[Patent Document 4] JP 10-251978A
[Patent Document 5] JP 2001-342434A

DISCLOSURE OF THE INVENTION

An object of the present invention is to provide a grain-finished leather-like sheet having a smooth and luster surface and a good hand, which is excellent in the scratch resistance, abrasion resistance and buckling wrinkle resistance and hardly damages or contaminates the object which comes into friction contact with its surface.

As a result of extensive research, the inventors have found a grain-finished leather-like sheet which achieve the above object and accomplished the present invention. Thus, the present invention relates to a grain-finished leather-like sheet composed of a fibrous substrate layer, a polyurethane non-porous layer and a polyurethane surface layer containing a binder polyurethane and polyurethane fine particles having a particle size of 1 to 50 μm which are successively laminated in this order, a total thickness of the polyurethane non-porous layer and the polyurethane surface layer being 150 μm or more, the polyurethane surface layer containing the polyurethane fine particles in an amount of 10 to 40 parts by mass per 100 parts by mass of the binder polyurethane, and the polyurethane fine particles being not exposed to the surface of the polyurethane surface layer.

BEST MODE FOR CARRYING OUT THE INVENTION

Figure 1:
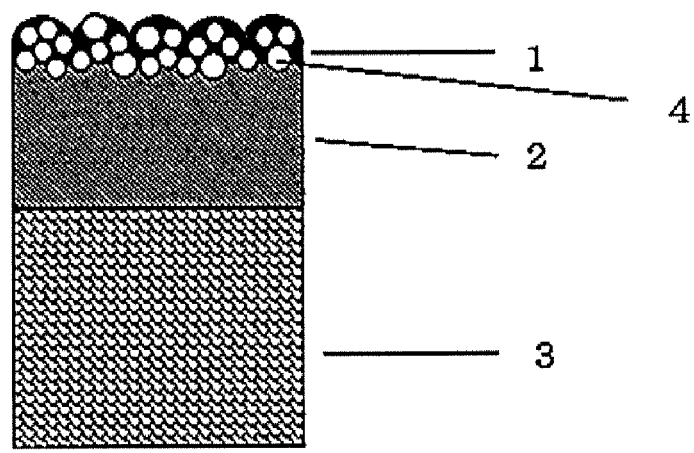
FIG. 1 is a schematic cross-sectional view of the grain-finished leather-like sheet of the invention, showing the state that the polyurethane fine particles are not exposed to the surface.

The present invention will be described in more detail below.

The fibrous substrate layer is composed of a fiber aggregate and an optionally impregnated elastic polymer. The fibers for constituting the fiber aggregate may be usual fibers, for example, fibers made of a synthetic resin such as polyester, polyamide, polyacrylonitrile, polyolefin and polyvinyl alcohol; man-made fibers such as regenerated cellulose fibers; and natural fibers such as cotton, ramie and wool. Examples of the fiber aggregate include a woven fabric, a knitted fabric, a nonwoven fabric and a laminated fabric made of a combination thereof, each being produced from the above fibers. The synthetic fiber may be produced from a single kind of polymer or may be produced by mix-spinning or composite-spinning two or more kinds of polymers. The mix-spun or composite-spun fibers, if used, are preferably converted to bundles of microfine fibers or hollow fibers having a number of voids therein by removing at least one of the polymer components by extraction or decomposition at any stage in the production of the leather-like sheet, or by dividing to respective polymer components.

In the present invention, a bulky nonwoven fabric having a good hand and good cushioning properties is preferably used as the fiber aggregate. The nonwoven fabric is produced by a known method in which the fibers mentioned above are made into a web, and the web is entangled by a needle punching or a jet stream. Alternatively, a laminate of a nonwoven fabric and a woven or knitted fabric is also usable as the fiber aggregate. The fiber aggregate such as the nonwoven fabric and the laminated fabric may be impregnated with a solution or dispersion of an elastic polymer, if necessary. Before impregnating a liquid of elastic polymer, the fiber aggregate may be made smooth or densified by a hot press, if necessary. To prevent the loss of shape of the fiber aggregate which is likely caused during the subsequent impregnation and coagulation of the elastic polymer liquid or extraction of the polymer component from the fibers, the fibers may be partly fuse-bonded by heat-pressing the fiber aggregate or the fibers may be fixed with sizing by impregnating a water soluble resin such as polyvinyl alcohol to the fiber aggregate and subsequently drying it.

Examples of the elastic polymer which is optionally impregnated to the fiber aggregate include at least one elastic polymer such as urethane polymers, acrylic acid polymers, vinyl chloride polymers, vinyl butyral polymers, amine polymers, amino acid polymers, silicones, acrylonitrile-butadiene copolymers, and styrene-butadiene copolymers; mixtures thereof and copolymers thereof, with polyurethane being particularly preferred in view of the hand, durability and adhesiveness to the polyurethane non-porous layer. Such polyurethane may be a polyurethane elastomer which is produced by the reaction of a polymer diol, an organic polyisocyanate and a chain extender. The polymer diol may have an average molecular weight of 500 to 2500 and at least one diol selected, for example, from polyester diol, polyether diol, polyester ether diol, polycaprolactone diol, polycarbonate diol and polyester polycarbonate dial. The organic polyisocyanate may have a molecular weight 500 or less and may be at least one isocyanate selected from, for example, organic triisocyanates, alicyclic diisocyanates, aliphatic diisocyanate having a cyclic group, and triphenylmethane-4,4,4-triisocyanate. The chain extender may be at least one low-molecular compound with a molecular weight of 300 or less having at least two active hydrogen atoms, which is selected from low-molecular diol, low-molecular diamine, hydrazine and dicarboxylic dihydrazide. The proportion of each raw material for the polyurethane may be selected so as to obtain suitable properties such as hand, deterioration resistance, yellowing resistance and dyeability according to the application of the grain-finished leather-like sheet.

The elastic polymer may be added with another polymer and an additive such as a stabilizer, a colorant and a coagulation regulator, if necessary. The elastic polymer is impregnated to the fiber aggregate, for example, in the form of a 3 to 40% by mass solution or dispersion, and coagulated by a wet method such as an immersion in an organic solvent (dimethylformamide, etc.)/water mixture at 10 to 80° C., a hot water treatment at 70 to 100° C. and a steam treatment at 100 to 200° C., or a dry method such as a heat drying at 50 to 200° C. Examples of the solvent and dispersion medium include dimethylformamide, toluene, xylene, methyl ethyl ketone, methyl isobutyl ketone, methanol, isopropanol, ethyl cellosolve, butyl cellosolve and water, which may be used singly or in combination of two or more. In view of the hand, the wet coagulation method is preferably used. Using the wet coagulation method, the elastic polymer is coagulated porously to give a natural leather-like hand. The amount of the elastic polymer to be impregnated to the fiber aggregate varies according to the end use, and in view of the total balance of hand the amount is preferably selected such that the mass ratio of the fibers in the fibrous substrate layer constituting the grain-finished leather-like sheet and the elastic polymer becomes 30:70 to 70:30.

When the fiber aggregate is made of mix-spun fibers or composite-spun fibers each being composed of two or more kinds of polymers, it is preferred to remove at least one of the polymer components of the fibers before or after impregnating the elastic polymer to the fiber aggregate, thereby generating fibers composed of at least one polymer which remains not removed. If the mix-spun or composite-spun fibers are sea-island fibers, bundles of microfine fibers composed of the island polymer are obtained by removing the sea component polymer by dissolution or decomposition, while hollow fibers composed of the sea component polymer having a number of voids therein are obtained by removing the island component polymer. If the composite-spun fibers are composed of two or more polymers each of which laminatedly extends in the lengthwise direction of the fibers, bundles of microfine fibers of each polymer are obtained by splitting the laminated polymers by a physical or chemical treatment. The removal by dissolution or decomposition and the physical or chemical treatment for converting the mix-spun or composite-spun fibers to bundles of microfine fibers or hollow fibers may be conducted under the conditions known in the fiber art, and a person skilled in the art can be easily select or determine such conditions.

The average fineness of each microfine fiber in the bundles of microfine fibers is preferably 0.5 dtex or less, more preferably 0.1 dtex or less, and still more preferably 0.05 dtex or less. If being 0.5 dtex or less, it is expected to obtain a fibrous substrate layer with a good flexibility and a leather-like hand. The lower limit of the average fineness of microfine fibers is not critical for obtaining the effect of the invention. In view of the properties of the grain-finished leather-like sheet and the productivity, an acceptable lower limit is 0.0001 dtex. The average fineness of microfine fibers referred to herein was determined by the calculation from the average diameter of the microfine fibers obtained by the observation of the grain-finished leather-like sheet under an electron microscope and the density of polymer.

The polyurethane for the polyurethane non-porous layer may be polyester polyurethane, polyether polyurethane, polyester-ether polyurethane, polycaprolactone polyurethane, polycarbonate polyurethane, mixtures thereof, or copolymers thereof. The details thereof are the same as those of the polyurethane described above with respect to the elastic polymer and omitted here for conciseness. The polyurethane may be blended with at least one thermoplastic elastomer of another type selected from polyester elastomer, polyamide elastomer, styrene elastomer, fluorine-containing elastomer, polybutadiene elastomer, urethane/vinyl chloride elastomer and ethylene copolymer.

The thickness of the polyurethane non-porous layer is selected such that the total thickness with the polyurethane surface layer described below is 150 μm or more, preferably 170 μm or more. If the total thickness is less than 150 μm, the fibrous substrate layer is compressed by line pressure when the surface layer is scratched with a nail which is pressed hardly thereon, even if the abrasion resistance of the surface layer is sufficiently high, thereby leaving a recessed mark thereon which looks like a deep scratch. In view of the scratch resistance, there is no upper limit for the total thickness of the polyurethane surface layer and the polyurethane non-porous layer. However, the upper limit is preferably 1 mm, because, if the total thickness is excessively large, the flexibility is deteriorated and the hand becomes hard, in addition, the mass of the grain-finished leather-like sheet is increased to increase the weight of the product much more than needed. Each of the polyurethane non-porous layer and polyurethane surface layer is usually made to a single layer, although made to two or more layers if necessary.

The polyurethane non-porous layer is generally formed by a melt film-forming method in which polyurethane tips optionally added with colorant, antioxidant, etc. are melt-kneaded in a kneader under heating and pressure, extruded into film from T-die under molten state, and pressed and solidified still in a flowable state on the fibrous substrate layer. Alternatively, the film extruded from T-die may be cooled to solidify and then bonded to the fibrous substrate layer using an adhesive such as polyurethane adhesive, acrylic adhesive, silicone adhesive, epoxy adhesive and cyanoacrylate adhesive. If the adhesive strength between the fibrous substrate layer and the non-porous layer is insufficient, the polyurethane non-porous layer can be melt-formed after applying a solution of polyurethane which has a flow initiation temperature lower than that of the polyurethane for the polyurethane non-porous layer by 20° C. or more to the surface of the fibrous substrate layer and drying it. Although not cost-effective, the polyurethane non-porous layer can be formed also by a known dry film-forming method or a method of applying a solution of polyurethane resin in a solvent or a high concentration polyurethane liquid called as a high solid on the fibrous substrate layer by a knife coating method or direct coating method and then drying.

The polyurethane non-porous layer may include fine voids in a slight amount which makes the layer substantially non-porous, as long as the effect of the invention is obtained. The substantially non-porous state referred to herein means that the content of voids is 5% or less based on the volume of the polyurethane layer. The polyurethane non-porous layer may be added with colorant, light stabilizer, natural fiber powder, inorganic powder, resin bead, and other additives in an amount not adversely affecting the effect of the invention.

The polyurethane surface layer contains polyurethane fine particles having a particle size of 1 to 50 μm in an amount of 10 to 40 parts by mass per 100 parts by mass of the polyurethane (binder polyurethane) constituting the polyurethane surface layer.

The resin for the binder polyurethane is preferably selected from polycarbonate polyurethane, polyester polyurethane, polyether polyurethane, modified products thereof, mixtures thereof, and copolymers thereof, with polycarbonate polyurethane and a mixed polyurethane mainly composed thereof being preferred, and a non-yellowing polycarbonate polyurethane and a mixed polyurethane mainly composed thereof being more preferred when a long durability is required.

The non-yellowing polycarbonate polyurethane is produced by the reaction between a polycarbonate diol component, a non-yellowing diisocyanate component and a chain extender.

Example of the polycarbonate diol component include at least one polyalkylene polycarbonate diol having an average molecular weight of 500 to 5000 which is selected from polyethylene polycarbonate diol, polybutyrene polycarbonate diol and polyhexamethylene polycarbonate diol; at least one polydialkylpolycarbonate diol having an average molecular weight of 500 to 5000 which is selected from polydimethyl polycarbonate diol and polydiethylpolycarbonate diol; and at least one polyester polycarbonate diol having an average molecular weight of 500 to 5000 which is selected from polybutyrene adipate polycarbonate diol and polyhexamethylene adipate polycarbonatediol.

Example of the non-yellowing diisocyanate component include an aliphatic or alicyclic diisocyanate having a molecular weight of 500 or less, with at least one selected from isophorone diisocyanate, cyclohexyl diisocyanate and dicyclohexylmethane diisocyanate being preferred. If necessary, a three or more functional non-yellowing polyisocyanate can be used in a small amount as a part of the non-yellowing diisocyanate component.

Example of the chain extender include aliphatic diols such as ethylene glycol, 1,2-propylene glycol, 1,3-propylene glycol, 1,4-butane diol, 1,5-pentane diol, 3-methyl-1,5-pentane diol, 1,6-hexane diol, 1,7-heptane diol, 1,8-octane diol, 2-methyl-1,8-octane diol, 1,9-nonane diol, and 1,10-decane diol; alicyclic diols such as cyclohexane dimethanol and cyclohexane diol; aliphatic diamines such as ethylenediamine and propylenediamine; alicyclic diamines such as isophoronediamine; hydrazine; and at least one low molecular compounds, such as dicarboxylic dihydrazide, having a molecular weight of 300 or less and two or more active hydrogen atoms.

In the present invention, the surface abrasion resistance is improved by adding a limited amount of polyurethane fine particles having a particle size of 1 to 50 μm to the binder polyurethane and preventing the fine particles from being exposed to the surface. The polyurethane for forming the fine particles is selected from known polyurethane, for example, polyurethane such as polyester polyurethane, polyether polyurethane and polycarbonate polyurethane and a mixture thereof, which are described above with respect to the elastic polymer. The polyurethane may be blended with another thermoplastic elastomer such as polyester elastomer, polyamide elastomer, styrene elastomer, fluorine-containing elastomer, polybutadiene elastomer, urethane/vinyl chloride elastomer, and ethylene copolymers. A cross-linked polyurethane which is produced by using a three or more functional component as a part of the raw material such as the diisocyanate component and the chain extender is preferably used because the polyurethane is not dissolved to an organic solvent or swelled during the formation of the polyurethane surface layer, although not necessary in any cases. To prevent the discoloration (mainly yellowing) with time, a non-yellowing polyurethane which is produced by using the non-yellowing diisocyanate as the diisocyanate component is preferably used.

The particle size of the polyurethane fine particles is 1 to 50 μm, preferably 3 to 30 μm. If being less than 1 μm, the abrasion resistance is insufficient, while the surface feels rough to the touch if exceeding 50 μm. The amount of the polyurethane fine particles to be added is 10 to 40 parts by mass, preferably 12 to 35 parts by mass per 100 parts by mass of the binder polyurethane. If being less than 10 parts by mass, the abrasion resistance is insufficient. The surface abrasion resistance is sufficient even when exceeding 40 parts by mass. However, the dispersibility throughout the binder polyurethane is deteriorated in the formation of the polyurethane surface layer, and the fine particles may be nearly exposed to the surface.

Figure 2:
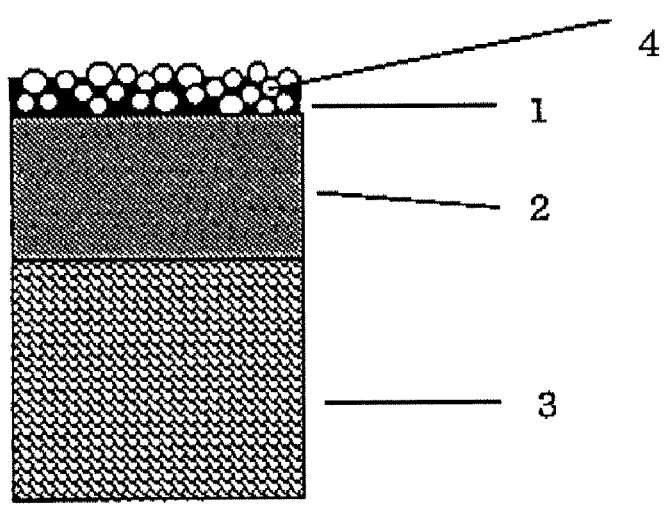
FIG. 2 is a schematic cross-sectional view of a known grain-finished leather-like sheet, showing the state that the polyurethane fine particles are exposed to the surface.

To obtain the grain-finished leather-like sheet which combines a good abrasion resistance, a good appearance and a hand, the surface layer is formed so as not to allow the polyurethane fine particles to be exposed to the surface. In the present invention, the state of the polyurethane fine particles being not exposed to the surface means that there is substantially no fine particle on the surface a part of which is completely exposed to the surface and that there is substantially no fine protuberance on the surface which is attributable to the shape of each fine particle not exposed. More specifically, the number of the exposed particles and the protuberances mentioned above are preferably 30 or less, more preferably 15 or less per 1 cm$^2$, when counted by the observation on an arbitrary portion of the polyurethane surface layer under an electron micrograph. FIG. 1 schematically shows the state that the fine particles are not exposed to the surface of the sheet of the invention. FIG. 2 schematically shows the state that the fine particles are exposed to the surface of a known sheet. In FIGS. 1 and 2, the polyurethane non-porous layer 2 and the polyurethane surface layer 1 are successively laminated on this order on the fibrous substrate layer 3. The polyurethane surface layer 1 contains the polyurethane fine particles 4. The polyurethane fine particles exposed to the surface are fallen off when the surface of an object being in contact with the polyurethane surface layer is rubbed with its surface or when the surface of the polyurethane surface layer is rubbed or scratched. The portion left after the falling off looks like an abrasion to impair the appearance. The surface having such abrasion diffuses light to deteriorate the brilliantness of color and fails to obtain a desired luster appearance. In addition, the surface becomes rough visually or to the touch according to the degree of exposure or the particle size.

The thickness of the polyurethane surface layer varies depending upon the particle size of the polyurethane fine particles to be blended, and preferably 5 μm or more, more preferably 10 μm or more in view of the abrasion resistance. Although the upper limit of the thickness is not specified as far as the abrasion resistance is concerned, the total thickness of the polyurethane surface layer and the polyurethane non-porous layer is preferably 150 μm to 1 mm in view of the flexibility and the balance with the hand as noted above. The thickness ratio of the polyurethane surface layer and the polyurethane non-porous layer is preferably 40:60 to 3:97.

The surface layer having the polyurethane fine particles not exposed to the surface can be formed, for example, by the following method. By dispersing the polyurethane fine particles in a solution of the binder polyurethane (concentration: 20 to 60% by mass), a coating solution is prepared. The coating solution is applied on an embossed releasing paper or a flat releasing paper. The coated solution is pressed onto the polyurethane non-porous layer which is formed on the fibrous substrate layer. After solidifying and bonding, the releasing paper is removed. Example of the solvent for preparing the binder polyurethane solution includes dimethylformamide, methyl ethyl ketone, toluene, xylene, methyl isobutyl ketone, methanol, isopropanol, ethyl cellosolve, and butyl cellosolve. Alternatively, the polyurethane surface layer is formed on a releasing paper in the same manner as above. Onto the polyurethane surface layer thus formed, a molten film of the polyurethane for the non-porous layer is extruded from T-die, pressed and solidified, to form a surface layer/non-porous layer laminate. Then, the fibrous substrate layer is bonded to the non-porous layer, and finally, the releasing paper is removed. The fibrous substrate layer may be bonded after the non-porous layer is solidified or may be bonded when the non-porous layer is still in the molten state.

It is preferred that the binder polyurethane and the polyurethane for forming the fine particles are the same in the composition or constituted from the same kind of unit or chemically similar unit. If meeting such requirement, the adhesiveness and compatibility between the binder polyurethane and the polyurethane fine particles are extremely enhanced, to obtain a maximum effect of improving the abrasion resistance and enhance the scratch resistance.

The polyurethane surface layer is deformed by the applied force more largely as its modulus is decreased. Therefore the stress due to rubbing is absorbed by its deformation, to enhance the resistance to damages. The polyurethane surface layer having such a function can be preferably formed from a binder polyurethane and polyurethane fine particles which provide a film having a 20% modulus of 294 N/cm$^2$ (30 kg/cm$^2$) or less when the film is made only from 100 parts by mass of the binder polyurethane and 10 to 40 parts by mass of the polyurethane fine particles. The lower limit of the modulus is not critical and preferably 29.4 N/cm$^2$ (3 kg/cm$^2$) to keep the surface properties such as the abrasion resistance which is evaluated by the weight loss after taper abrasion test and the change of appearance before and after the test. The modulus is steeply increased in some cases according to the resin composition when the degree of elongation is high, even if the modulus is low at a low degree of elongation. The 300% modulus of the film is preferably 980 N/cm$^2$ (100 kg/cm$^2$) or less, more preferably 784 N/cm$^2$ (80 kg/cm$^2$) or less, because the polyurethane surface layer becomes tough and follows the applied load to prevent the occurrence of damages. The lower limit is not critical and preferably 196 N/cm$^2$ (20 kg/cm$^2$) or less in view of maintaining the surface properties.

If the elongation at break of the film is low, the polyurethane surface layer easily exceeds its deformation limit upon application of force even if its modulus is low. Therefore, the elongation at break of the film is preferably 500% or more, more preferably 700% or more. The higher the upper limit of the elongation at break, the better. However, the elongation at break industrially achieved while meeting the requirement about the modulus is generally about 2000%.

As described above, the polyurethane surface layer has a excellent scratch resistance and abrasion resistance, when it is formed from a binder polyurethane and polyurethane fine particles which can form a fine particle-containing film having a low 20% modulus and 300% modulus and a high elongation at break.

The modulus and elongation of the above film made only from the binder polyurethane and the polyurethane fine particles are measured by the following method.

A film with about 0.1 mm thick was formed on a flat releasing paper. A sample of 25 mm wide and 100 mm long was cut out of a portion having a uniform thickness. The thickness was measured according to JIS L1096:1999 8.5.1 "Testing Methods for Woven Fabrics" under a load of 23.5 kPa. After moisture-conditioning the sample for 24 h or more (20° C., 65% relative humidity), the sample was held with upper and lower chucks at its lengthwise ends so as to avoid sagging (chuck interval: 50 mm). Then, the sample was pulled at a constant tensile speed of 25 mm/min. (50% elongation/min), and the stress up to the break and the elongation at break were measured.

The adhesiveness between the binder polyurethane and the polyurethane fine particles can be further enhanced by adding the binder polyurethane with a two-part urethane resin with a high cross-linking density which contains a cross-linkable urethane resin and a cross-linking agent. In this case, the amount of the cross-linking agent and the kind of the releasing paper should be selected while taking the easiness of removing the releasing paper from the polyurethane surface layer into consideration. The binder polyurethane may be added with an additive such as a cross-link promotor, a colorant such as organic pigment, a flame retardant, and an antioxidant. If deep colors are required in the intended use, a transparent or colored polyurethane intermediate layer may be interposed between the surface layer and the non-porous layer as long as the effect of the invention is not adversely affected.

The thicknesses of the polyurethane surface layer and the polyurethane non-porous layer in the grain-finished leather-like sheet thus obtained are as described above. The thickness of the fibrous substrate layer is preferably 1 to 3 mm.

EXAMPLES

The present invention will be described in more detail with reference to the examples. However, it should be noted that the scope of the present invention is not limited thereto. The "part(s)" and "%" used in the examples are based on mass unless otherwise noted. The grain-finished leather-like sheet was evaluated by the following methods.

(1) Appearance

The surface of a grain-finished leather-like sheet was visually observed for its color and luster feel by randomly selected five panelists and evaluated by the following ratings.

A: brilliant surface color with luster feel and high quality.
C: pale surface color and with poor luster feel.

(2) Touch

The surface of a grain-finished leather-like sheet was organoleptically examined for its touch by randomly selected five panelists and evaluated by the following ratings.

A: smooth without roughness.
B: not smooth with roughness.

(3) Scratch Resistance

A nail was hardly pressed to the surface of a grain-finished leather-like sheet and then the surface was slowly scraped with the nail. The degree of recessed scratch on the surface was evaluated by the following ratings.

A: no recessed scratch.
B: shallow recessed scratch.
C: deep recessed scratch.

(4) Abrasion Resistance

A nail was lightly pressed to the surface of a grain-finished leather-like sheet and then the surface was scraped with the nail in a moment. The degree of abrasion was evaluated by the following ratings.

A: no abrasion.
B: abrasion occurred.

Example 1

Sea-island composite fibers composed of 50 parts of polyester (island component) and 50 parts of low density polyethylene (sea component) were produced by melt spinning. The composite fibers were drawn by 2.5 times in a hot water at 70° C., provided with an oil, mechanically crimped, and then dried. The crimped fibers were cut to 4-dtex staples of 51 mm long. The staples were crosslapped to a web having a mass per unit area of 900 g/m². The web was needle-punched alternatively from both sides at a total punching density of about 500 punch/cm², and then pressed with a calender roll, to obtain a entangled nonwoven fabric having a smooth surface. The entangled nonwoven fabric had a mass per unit area of 850 g/m² and an apparent density of 0.3. The entangled nonwoven fabric was impregnated with a 13% dimethylformamide (DMF) solution of polyurethane mainly composed of polyester polyurethane, and then, immersed in a DMF/water mixture to wet-coagulate the polyurethane into a porous structure. Thereafter, the composite fibers were converted to microfine fibers (average fineness: 0.002 dtex) in a hot toluene by removing the sea component by dissolution, to obtain a fibrous substrate layer. The obtained fibrous substrate layer had a thickness of 1.5 mm and the ratio of the microfine fibers and the polyurethane was 61:39. Both the surfaces of the fibrous substrate layer were buffed with a sand paper to adjust the thickness to 1.2 mm, and simultaneously, smoothen the surfaces.

On a releasing paper ("DE-125" manufactured by Dainippon Printing Co., Ltd.), a coating solution was applied in an amount giving a dry film thickness of 15 μm and dried to form a polyurethane surface layer. The coating solution used above was composed of 100 parts of a solution (resin component: 25%) of a non-yellowing polycarbonate polyurethane containing non-yellowing polyurethane fine particles (particle size: 15 μm, "Dynamic Bead 7150" manufactured by Dainichiseika Color & Chemicals Mfg. Co., Ltd.) in an amount of 24 parts per 100 parts of the dry weight of the solution of non-yellowing polycarbonate polyurethane; 20 parts of "Leathermin DUT 4790 Black" (manufactured by Dainichiseika Color & Chemicals Mfg. Co., Ltd.); 30 parts of DMF; and 30 parts of methyl ethyl ketone.

Separately, a film was prepared by only using a non-yellowing polycarbonate polyurethane and non-yellowing polyurethane fine particles. The film had a 20% modulus of 172 N/cm² (17.6 kg/cm²), a 300% modulus of 580 N/cm² (59.2 kg/cm²), and an elongation at break of 840%.

On the obtained polyurethane surface layer, a DMF solution containing 100 parts of a one-part polyether polyurethane ("Leathermin ME 8116" manufactured by Dainichiseika Color & Chemicals Mfg. Co., Ltd.) and 20 parts of "Leathermin DUT 4790 Black" was applied in an amount giving a dry film thickness of 20 μm and dried, to form a polyurethane non-porous layer A on the polyurethane surface layer.

Separately, a mixture was prepared by blending 100 parts of polyester polyurethane pellets ("Kuramiron U-3190" manufactured by Kuraray Co., Ltd.) and 3 parts of black pigment pellets (polyethylene containing pigment in 30% concentration). The polyester polyurethane pellets were mainly composed of 3-methyl-1,5-pentanediol, polyester diol derived from adipic acid, butanediol, and 4,4'-diphenylmethane diisocyanate. The mixture was extruded from T-die of an extruder at a melting zone temperature of 220° C. and a die entrance temperature of 220° C. into a molten film (polyurethane non-porous layer B) having a thickness of 200 μm, which was introduced between the polyurethane non-porous layer A and the fibrous substrate layer. The obtained laminate was pressed with a metal roll and an elastic roll and dried, and then, the releasing paper was removed to obtain a grain-finished leather-like sheet having a laminate structure of polyurethane surface layer (thickness: 15 μm)/polyurethane non-porous layer (total thickness of non-porous layers A and B: 220 μm)/fibrous substrate layer (thickness: 1.2 mm). The obtained grain-finished leather-like sheet had a cross section shown in FIG. 1 and the polyurethane fine particles therein were not exposed to surface. The wrinkle resistance and hand were also good. The results of evaluation are shown in Table 1.

Comparative Example 1

On the smoothened surface of the fibrous substrate layer obtained in Example 1, the mixture used in Example 1 for forming the non-porous layer B was extruded from T-die of an extruder in the form of film and pressed in the molten state, to obtain a laminate of the fibrous substrate layer and the polyurethane non-porous layer (thickness: 220 μm).

On the surface of the polyurethane non-porous layer of the obtained laminate, a coating solution was applied by a knife coating method in an amount giving a dry film thickness of 15 μm and dried to obtain a grain-finished leather-like sheet having a laminate structure of polyurethane surface layer (thickness: 15 μm)/polyurethane non-porous layer (thickness: 220 μm)/fibrous substrate layer (thickness: 1.2 mm). The coating solution used above was composed of 100 parts of a solution (resin component: 25%) of a non-yellowing polycarbonate polyurethane containing non-yellowing polyurethane fine particles in an amount of 25 parts per 100 parts of the dry weight of the solution of non-yellowing polycarbonate polyurethane; 20 parts of "Leathermin DUT 4790 Black"; 30 parts of DMF; and 30 parts of methyl ethyl ketone. As shown in FIG. 2, the polyurethane fine particles were exposed to the surface of the obtained grain-finished leather-like sheet.

Separately, a film was prepared by only using the polyurethane for forming the polyurethane surface layer and the polyurethane fine particles. The film had a 20% modulus, a 300% modulus and an elongation at break which were the same as those in Example 1.

Comparative Example 2

A grain-finished leather-like sheet was produced in the same manner as in Example 1 except for changing the thickness of the polyurethane non-porous layer B to 100 μm. The laminate structure thereof was polyurethane surface layer (thickness: 15 μm)/polyurethane non-porous layer (total thickness of non-porous layers A and B: 120 μm)/fibrous substrate layer (thickness: 1.2 mm). The polyurethane fine particles therein were not exposed to surface. The results of evaluation are shown in Table 1. The scratch resistance was poor because the total thickness of the polyurethane surface layer and the polyurethane non-porous layer was small.

Comparative Example 3

A grain-finished leather-like sheet was produced in the same manner as in Example 1 except for omitting the use of the polyurethane fine particles. The laminate structure thereof was polyurethane surface layer (thickness: 15 μm, with no fine particle)/polyurethane non-porous layer (total thickness of the non-porous layers A and B: 220 μm)/fibrous substrate layer (thickness: 1.2 mm). The results of evaluation are shown in Table 1.

Separately, a film was prepared by only using the polyurethane for forming the polyurethane surface layer and the polyurethane fine particles. The film had a 20% modulus of 204 N/cm² (20.8 kg/cm²), a 300% modulus of 521 N/cm² (53.2 kg/cm²) and an elongation at break of 990%.

Comparative Example 4

On the smoothened surface of the fibrous substrate layer obtained in Example 1, the mixture used in Example 1 for forming the non-porous layer B was extruded from T-die of an extruder in the form of film and pressed in the molten state, to obtain a laminate of the fibrous substrate layer and the polyurethane non-porous layer I (thickness: 220 μm).

Separately, on a releasing paper ("DE-125" manufactured by Dainippon Printing Co., Ltd.), a coating solution was applied in an amount giving a dry film thickness of 15 μm and dried to form a polyurethane surface layer. The coating solution used above was composed of 100 parts of a solution (resin component: 25%) of a non-yellowing polycarbonate polyurethane; 20 parts of "Leathermin DUT 4790 Black" (manufactured by Dainichiseika Color & Chemicals Mfg. Co., Ltd.); 30 parts of ME and 30 parts of methyl ethyl ketone.

On the obtained polyurethane surface layer, a DMF solution containing 100 parts of a one-part polyether polyurethane ("Leathermin ME 8116" manufactured by Dainichiseika Color & Chemicals Mfg. Co., Ltd.) and 20 parts of "Leathermin DUT 4790 Black" (manufactured by Dainichiseika Color & Chemicals Mfg. Co., Ltd.) was applied in an amount giving a dry film thickness of 20 μm and dried, to form a polyurethane non-porous layer II on the polyurethane surface layer. On the polyurethane non-porous layer II, an adhesive was applied in an amount of 100 g/m². The adhesive was prepared by mixing 25 parts of the non-yellowing polyurethane fine particles used in Example 1, 100 parts of two-part polyurethane ("UD-8310" manufactured by Dainichiseika Color & Chemicals Mfg. Co., Ltd.), a cross-linking agent and a cross-link promotor, and diluting the resultant mixture with dimethylformamide so as to adjust the viscosity to 5000 cps (30° C.). After drying but in a state that the adhesive was still tacky, the laminate applied with the adhesive was superposed to the polyurethane non-porous layer I of the above laminate, pressed and heat-treated to complete the cross linking of the adhesive. Then, the releasing paper was removed, to obtain a grain-finished leather-like sheet having a laminate structure of polyurethane surface layer (thickness: 15 μm, with no fine particle)/polyurethane non-porous layer II (thickness: 20 μm)/adhesive layer (with fine particles)/ polyurethane non-porous layer I (thickness: 220 μm)/fibrous substrate layer (thickness: 1.2 mm). The results of evaluation are shown in Table 1.

Separately, a film was prepared by only using the polyurethane for forming the polyurethane surface layer and the polyurethane fine particles to be contained in the adhesive layer. The film had a 20% modulus, a 300% modulus and an elongation at break which were the same as those in Comparative Example 3.

Comparative Example 5

A grain-finished leather-like sheet was produced in the same manner as in Example 1 except for using, in place of the non-yellowing polyurethane fine particles, spherical fine particles of benzoguanamine-formaldehyde condensate (average particle size: 12 μm; "Epostar L15" manufactured by Nippon Shokubai Co., Ltd.) in an amount of 25 parts per 100 parts of the dry weight of the non-yellowing polycarbonate polyurethane solution. The laminate structure thereof was polyurethane surface layer (thickness: 15 μm)/polyurethane non-porous layer (total thickness of the non-porous layers A and B: 220 μm)/fibrous substrate layer (thickness: 1.2 mm). The spherical fine particles were not exposed to the surface of the obtained grain-finished leather-like sheet. The results of evaluation are shown in Table 1.

Separately, a film was prepared by only using the polyurethane for forming the polyurethane surface layer and the spherical fine particles of benzoguanamine-formaldehyde condensate. The film had a 20% modulus of 418 N/cm$^2$ (42.7 kg/cm$^2$), a 300% modulus of 758 N/cm$^2$ (77.3 kg/cm$^2$) and an elongation at break of 630%.

Comparative Example 6

A grain-finished leather-like sheet was produced in the same manner as in Example 1 except for using a non-yellowing polycarbonate polyurethane having a high 300% modulus and using the non-yellowing polyurethane fine particles in an amount of 25 parts per 100 parts of the dry weight of the non-yellowing polycarbonate polyurethane solution. The laminate structure thereof was polyurethane surface layer (thickness: 15 μm)/polyurethane non-porous layer (total thickness of the non-porous layers A and B: 220 μm)/fibrous substrate layer (thickness: 1.2 mm). The polyurethane fine particles were not exposed to the surface of the grain-finished leather-like sheet. The results of evaluation are shown in Table 1.

Separately, a film was prepared by only using the polyurethane for forming the polyurethane surface layer and the polyurethane fine particles. The film had a 20% modulus of 141 N/cm$^2$ (14.4 kg/cm$^2$), a 300% modulus of 1497 N/cm$^2$ (152.8 kg/cm$^2$) and an elongation at break of 510%.

TABLE 1

|  | Example | Comparative Examples | | | | | |
|---|---|---|---|---|---|---|---|
|  | 1 | 1 | 2 | 3 | 4 | 5 | 6 |
| Appearance | A | C | A | A | A | A | A |
| Touch | A | C | A | A | A | A | A |
| Scratch resistance | A | A | C | B | B | A | A |
| Abrasion resistance | A | C | A | C | C | C | B |

INDUSTRIAL APPLICABILITY

The grain-finished leather-like sheet of the invention has a smooth and luster surface, a good hand, and excellent scratch resistance, abrasion resistance and buckling wrinkle resistance. The grain-finished leather-like sheet is extremely suitable for bags such as school backpack, pouches, sport shoes, general shoes and balls.

What is claimed is:

1. A grain-finished leather-like sheet comprising a fibrous substrate layer, a polyurethane non-porous layer and a polyurethane surface layer which are successively laminated in this order,
    the polyurethane surface layer comprising a binder polyurethane and polyurethane fine particles having a particle size of 1 to 50 μm,
    a total thickness of the polyurethane non-porous layer and the polyurethane surface layer being 150 μm or more,
    the polyurethane surface layer comprising the polyurethane fine particles in an amount of 10 to 40 parts by mass per 100 parts by mass of the binder polyurethane, and
    the polyurethane fine particles being not exposed to the surface of the polyurethane surface layer.

2. The grain-finished leather-like sheet according to claim 1, wherein a film which consists of the binder polyurethane and the polyurethane fine particles has a 20% modulus of 30 kg/cm$^2$ or less.

3. The grain-finished leather-like sheet according to claim 1, wherein a film which consists of the binder polyurethane and the polyurethane fine particles has a 300% modulus of 100 kg/cm$^2$ or less.

4. The grain-finished leather-like sheet according to claim 1, wherein a film which consists of the binder polyurethane and the polyurethane fine particles has an elongation at break of 700% or more.

5. The grain-finished leather-like sheet according to claim 1, wherein a thickness of the polyurethane surface layer is 5 μm or more.

6. The grain-finished leather-like sheet according to claim 1, wherein the fibrous substrate layer comprises a nonwoven fabric and a porous elastic polymer which is impregnated between fibers constituting the nonwoven fabric, and a mass ratio of the fibers and the elastic polymer is 30:70 to 70:30.

* * * * *